SYSTEM OF THREE DIPOLES

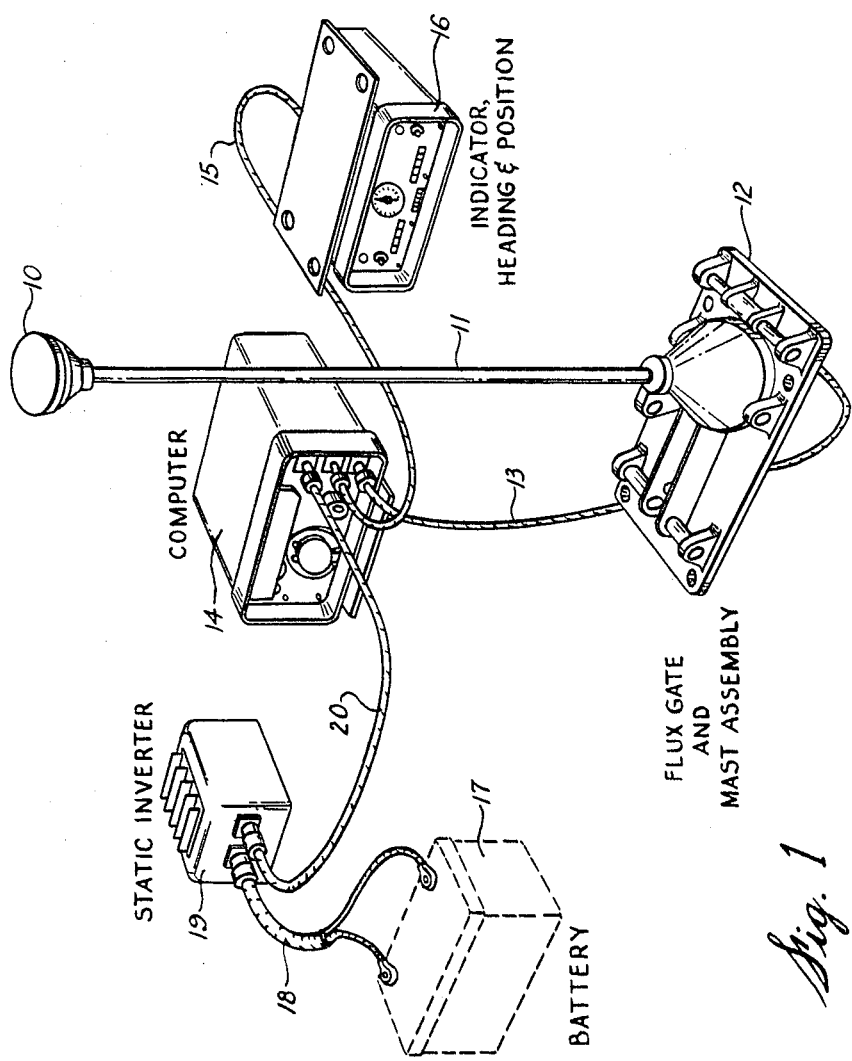

INVENTORS:
Dimitri PETROV
Robert W. Wright
BY
Kolbe and Kolbe
ATTORNEY

HEADING ERROR DUE TO VEHICLE
PERMANENT MAGNETISM

HEADING ERROR DUE TO VEHICLE
INDUCED MAGNETISM

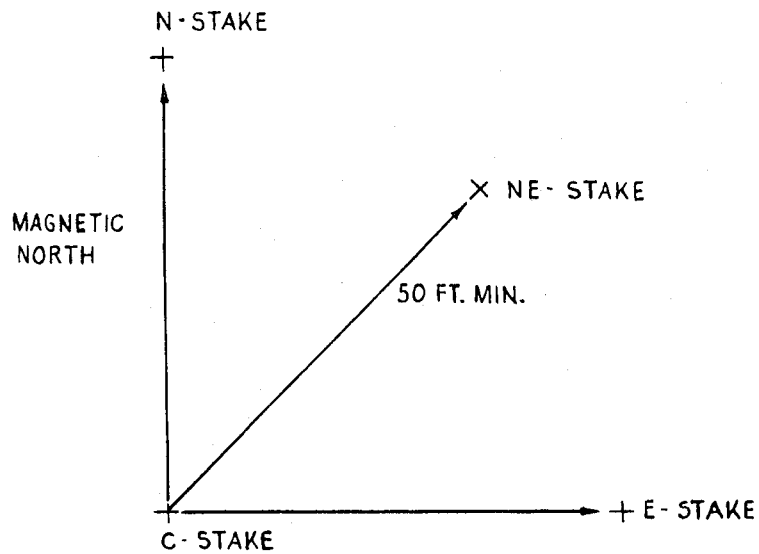
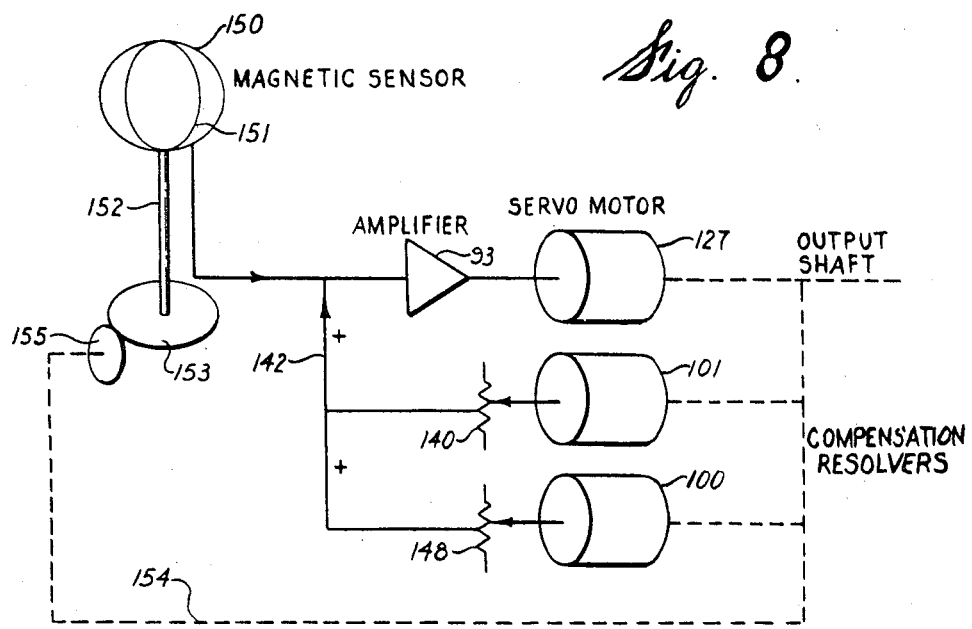
Fig. 8.
Fig. 9

3,584,388
HEADING REFERENCE SYSTEM
Dimitri Petrov and Robert W. Wright, Montreal, Quebec, Canada, assignors to Aviation Electric Limited, Montreal, Quebec, Canada
Filed May 28, 1968, Ser. No. 732,562
Claims priority, application Canada, May 31, 1967, 991,873
Int. Cl. G01c 17/38, 19/36
U.S. Cl. 33—225                             8 Claims

ABSTRACT OF THE DISCLOSURE

A heading reference system for use in a vehicle to counteract the distorting effect of the metallic mass of the vehicle by determining the distance of the vehicle from a predetermined starting point, determining its direction of travel and providing resolver units for generating signals to compensate for the permanent magnetic disturbance effect of the earth's magnetic field concentrated in the vehicle so that heading reference information can be obtained as to the present position and direction of travel of the vehicle.

---

This invention relates to heading reference systems (sometimes referred to as magnetic compass systems) and, particularly, to heading reference systems, and also navigation systems, for vehicles, such as aircraft, boats, ships, jeeps, and tanks.

Commanders of land vehicles such as jeeps and tanks have often had to rely on map reading for accurate navigation and for this purpose, a map with well-defined landmarks is required. The location of the vehicle is determined by noting its position with respect to landmarks in the operational area, and consequently, such a map reading procedure is very difficult or impossible when operating under fog, smog or night conditions, or when the vehicle is a tank having its hatch cover closed. Furthermore, in areas such as the Arctic and desert regions of the world, landmarks are relatively few whilst in other areas, accurate maps are not available. Furthermore, the time spent by a vehicle commander on conventional map reading techniques interferes with his other duties and can reduce the efficiency of a military vehicle.

In order to overcome the above-mentioned disadvantages of navigation by map reading, a heading reference system in the form of a vehicle navigation system has previously been built and this is described by E. Wall in the Journal of the Institute of Navigation (U.S.A.), "Navigation," volume 12, No. 1, Spring 1965. That navigation system includes a computer unit, a heading and position indicator unit, a vehicle position plotter unit, a heading indicator unit, a gyro compass unit, and a power supply unit.

The above-mentioned previous system continuously computed and displayed the exact geographical location of the vehicle and the direction in which it was heading. The inputs to the land navigation system were (1) distance travelled by the vehicle as measured by an odometer drive and (2) direction of travel obtained from a true north-seeking gyro compass. The computer employed an accurate mechanical analogue computing element (ball resolver) to convert inputs representing distance and direction of travel into electrical output pulses which represent east/west and north/south movement of the vehicle. The commander's heading and positioning indicator unit displaced the computer outputs (vehicle position) as two four-digit map references, and a 0–360° dial continuously indicated the grid heading of the vehicle. The vehicle position plotter unit provided a continuous pictorial representation of the geographic location of the vehicle and the direction in which it was travelling. An illuminated image of a positional dot and directional arrow was projected onto the underside of a standard military map attached to the top of the plotter. The display, therefore, enabled the navigator to pictorially steer the vehicle along a prescribed course without manual plotting or mental calculations. The heading indicator unit, necessary only in vehicles where the driver is separated from the commander, continuously displayed vehicle heading and could be used as a steering aid for a prescribed heading. The system operated from the vehicle battery and employed a static inverter to obtain the alternating current required by the compass and other units of the system. The land vehicle navigation system, in use, achieved an accuracy within one percent of the distance travelled.

In the above-mentioned previous system a gyro compass was used. The gyro compass unit is, however, a relatively expensive item and its cost constitutes a substantial portion of the cost of a whole system but was unavoidable prior to the present invention, if reliability and accuracy were to be achieved.

It is an object of the present invention to provide a heading reference system which is a modification of the above-mentioned previous system in that it does not utilize a gyro compass unit but still provides a heading reference system having comparable reliability and accuracy characteristics.

Accordingly, the present invention provides a heading reference system including:

(a) first means for providing a first indication of the distance of a movable object from a predetermined starting point;
(b) second means for providing a second indication of the direction of travel;
(c) first compensating means for supplying a signal to said second means to compensate for the permanent magnetic disturbance effect due to a disturbing magnetic mass; and
(d) second compensating means for supplying a signal to said second means to compensate for the induced disturbing magnetic effect of the earth's magnetic field concentrated adjacent the system, whereby said second indication is substantially free of said disturbance effects.

More specifically, according to the present invention, there is provided a heading reference system for a vehicle including:

(a) first means for providing a first indication of the distance of the vehicle from a predetermined starting point;
(b) second means for providing a second indication of the direction in which the vehicle is headed;
(c) first compensating means for supplying a signal to said second means to compensate for the permanent magnetic disturbance effect due to the vehicle's magnetic mass; and
(d) second compensating means for supplying a signal to said second means to compensate for the induced magnetic effect of the earth's magnetic field concentrated in the vehicle, whereby said second indication is substantially free of said disturbance effects.

The invention will now be described, by way of example, with reference to the accompanying drawings in which:

FIG. 1 is a diagrammatic representation of the apparatus utilized in a navigation system according to the present invention for a land vehicle;

FIG. 8 illustrates a pattern of stakes used in calibration; and

FIG. 9 illustrates a further embodiment of the invention.

Figure 2A:
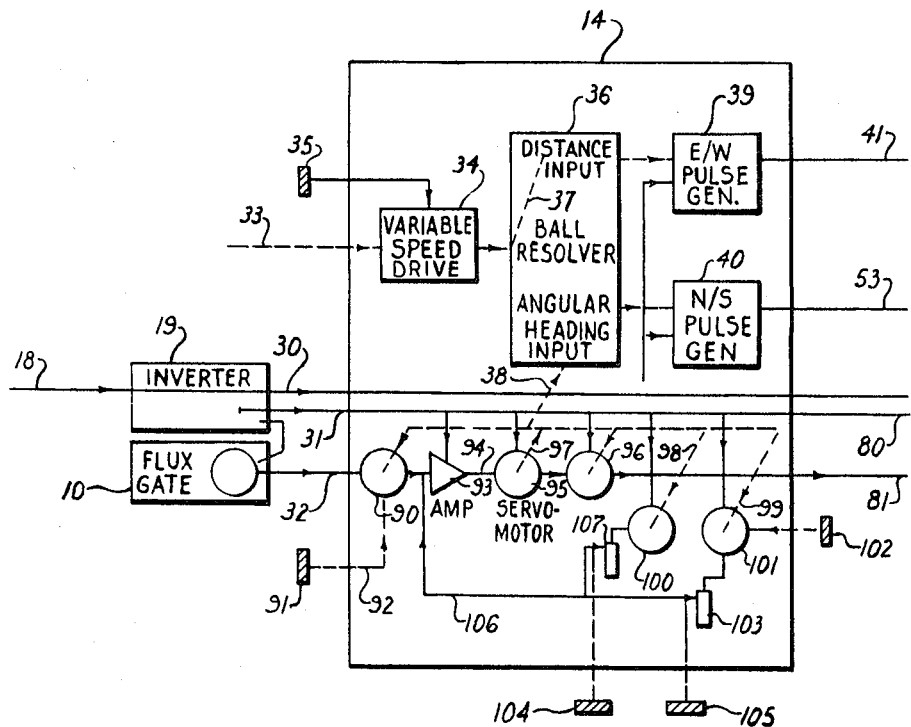
FIG. 2 is made up of FIGS. 2A and 2B placed side by side with FIG. 2B on the right and is a block diagrammatic representation of the major components of the navigation system as shown in FIG. 1.

As mentioned above, when a land vehicle such as a jeep or tank is travelling over a terrain, it is necessary for the vehicle commander to have an indication as to the position of the vehicle at each instant. This is most conveniently provided when the vehicle's position is indicated on a map of the terrain through which the vehicle is passing, although it is to be appreciated that such a map is not always available when a vehicle is travelling through unknown country and in such a case, the vehicle's position in relation to a known starting point is required. The use of a magnetic compass-type system on a vehicle is subject to errors arising from the inherent magnetization of the metallic mass of the vehicle, i.e. its permanent magnetic disturbance effect or arising as a result of the earth's field being distorted and concentrated through the metallic magnetic mass of the vehicle to produce an induced magnetic effect. These effects obviously cause a deviation in the reading of a magnetic compass resulting in errors and inaccuracies whereby the vehicle commander does not know the vehicle's true position and does not know the vehicle's heading, i.e. the direction in which the vehicle is pointed and, in motion, travelling.

According to the present invention, compensation is provided for the above-mentioned errors. The compensation for the magnetic signature of the carrier vehicle, i.e. the inherent permanent and induced magnetic disturbance effect due to the magnetic mass of the vehicle carrying the navigation system, takes place within a heading servo loop and the compensation is of a dynamic nature in that it varies with the heading of the vehicle. Measurements and calculations have to be made for each type of vehicle having a navigation system according to the invention installed therein, but the results of the calculations should be applicable to all vehicles of that type. Therefore, once the measurements and calculations have been made for one jeep, for example, then the characteristics of all jeeps of that type will be known. It will be appreciated that the component of the induced disturbance is essentially along the axis of most vehicles and therefore azimuth phase adjustment is not usually required for the induced magnetism as with the permanent magnetic disturbance.

Extensive studies by the present applicants supplemented by magnetometer measurements taken on several types of soft-skinned vehicles have shown that the magnetic characteristics or signature of a carrier vehicle can be represented by three pairs of magnetic dipoles oriented respectively along the longitudinal, lateral and vertical axes of the vehicle and due respectively to the permanent and induced magnetism of the steel and iron parts of the vehicle. If the flux gate and mast assembly (shown in FIG. 1 and to be described below) is mounted vertically above or nearly over, the magnetic centroid (the point of intersection of these dipoles) of the carrier, the disturbing effect of the permanent and induced vertical dipoles can be neglected and the compensating signal will be of the form:

$$k[A \sin (\phi - \theta) + B \sin 2\phi]$$

where $\phi$ is the heading angle with reference to magnetic north and the underlined parameters (A, $\theta$ and B) are respectively the amplitude and phase of the compensation for permanent magnetism and the amplitude of the compensation for induced magnetism. These parameters are separably adjusted for each vehicle at the time of installation of the navigation system in accordance with a calibration procedure to be described in detail with reference to FIGS. 8 and 9.

The compensation is, in one construction according to the present invention, physically effected by electromagnetic resolver units whose excitation signals are supplied from adjustable potential dividers connected in such a manner that variations A.C. supply voltage from the inverter are nullified. Control knobs for adjusting the potential dividers (which set the A and B parameters) and for adjusting the phase angle of the sin $\phi$ resolver (which sets the $\theta$ parameter) are brought out through the front panels of Computer and Computer-Indicator units shown in FIG. 1. A detailed discussion of the theoretical and experimental basis for the magnetic compensation system according to the present invention will be given below but referring first of all to FIG. 1, there is illustrated apparatus for a navigation system according to the present invention as applicable to a land vehicle.

The apparatus comprises a compass transmitter unit 10, of a type well known in the art, such as a Fluxgate or Fluxvalve (trade names), which includes three windings in each of which the earth's magnetic field induces a voltage whereby the earth's magnetic field is defined in a known manner.

The compass transmitter unit 10 is mounted on top of a mast 11 and, on the vehicle, is mounted over or near the magnetic centroid of the vehicle so as to reduce disturbing effects of the vertical dipole. The mast 11 and compass transmitter 10 are supported on a plate assembly 12, possibly on the vehicle's roof. Conveniently, the compass transmitter and mast assembly may consist of a compass transmitter, a protective case, a mast up to one meter high and a mounting pedestal, i.e. plate assembly, the compass transmitter incorporating modifications for the purposes of increasing the damping factor of the pendulous suspension and to reduce the change of this damping factor with change in ambient temperature.

The compass transmitter unit 10 (FIG. 1) is connected by an electrical cable 13 to a computer unit 14 which may be a modified version of the standard C-2 system computer which was utilized in the above-mentioned previous navigation system. However, two potential divider circuits and two electro-mechanical resolvers with their associated gear trains have been added, together with other modifications which will be described in greater detail with reference to FIG. 3.

The computer unit 14 is connected by an electrical cable 15 to a heading and position indicator unit 16 which may conveniently be identical to that used in the above-mentioned C-2 previous system, except that its unit lighting on-off switch is modified to be a system on-off switch.

Power for operation of the navigation system in the vehicle may be obtained from the vehicle's battery unit 17 supplying a voltage through electrical cable 18 to a static inverter unit 19 which supplies power to the computer unit 14 through an electrical cable 20.

Figure 2B:
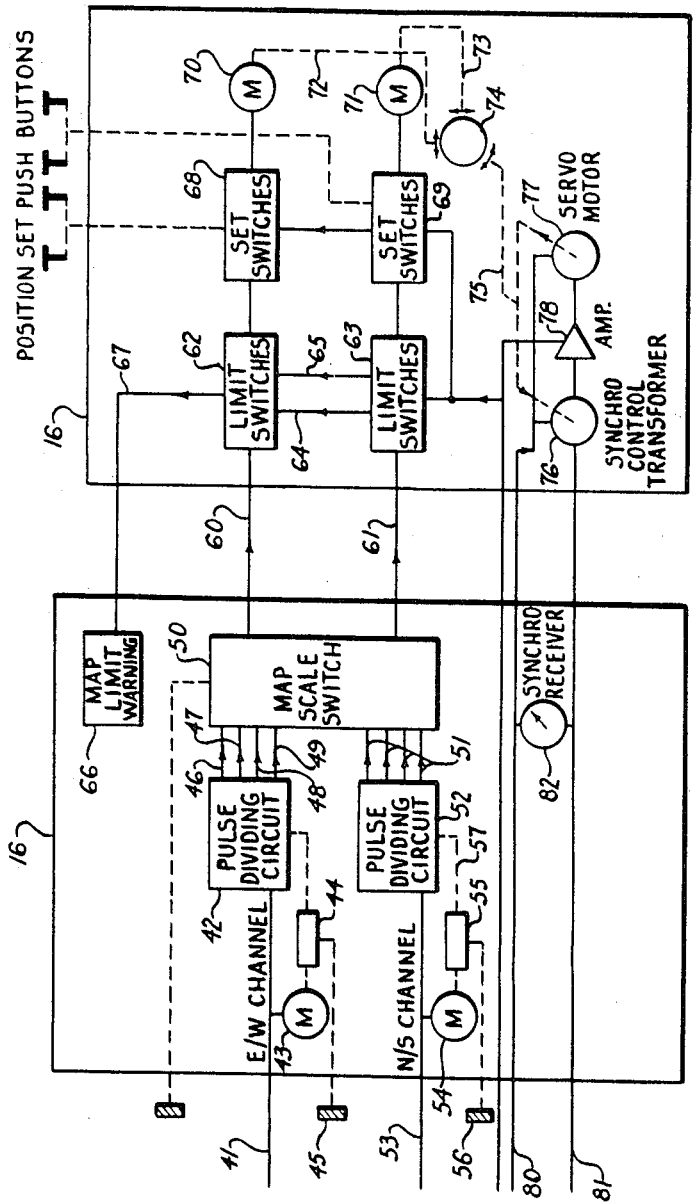

Referring now to FIG. 2, there is shown a basic block diagrammatic representation of the units making up part of the navigation system according to the present invention and as illustrated in FIG. 1. The same reference numerals have been used for like parts wherever possible.

Power from the 24-volt battery 17 (FIG. 1) is fed along connection 18 to inverter 19 which is a 26 v. 400 cycle per second AC converter whose output is fed along connections 30 and 31 to the various units as shown in FIG. 2.

In order to obtain a first indication of the distance travelled from a predetermined starting point by the land vehicle in which the navigation system is installed, the vehicle odometer cable is connected via mechanical connection 33 to a variable speed drive unit 34 having a manual distance adjust control 35. The variable speed drive unit 34 feeds a ball resolver unit 36 having two inputs, a distance input 37 and an angular heading input 38. The output of the ball resolver unit 36 is fed to an east/west pulse generator 39 and a further output is fed to a north/south pulse generator 40. The e/w pulse generator supplies a signal along connection 41 to a pulse dividing circuit 42 and to a motor 43 controlling an indicator 44 having an east-west co-ordinate set control 45. The pulse dividing circuit 42 supplies outputs along electrical connections 46, 47, 48 and 49 to a map scale switch 50. The map scale switch 50 also receives an input along full connections 51 from a pulse dividing circuit 52 which receives an input along connection 53 from the n/s pulse generator 40. The electrical signals on connection 53 are also used to control a motor 54 which itself controls a mechanical indicator 55 having a n/s co-ordinate set control 56 and a mechanical connection 57 to the pulse dividing circuit 52, similar to that shown for the units 44 and 42.

Outputs from the map scale switch unit 50 are fed along electrical connections 60 and 61 respectively to limit switches 62 and 63 which are interconnected by electrical connections 64 and 65. A map limit warning indicator 66 is also provided within the heading and position indicator 16 and is electrically connected to receive a signal along connection 67 from the limit switch 62. The limit switches and the circuitry associated therewith are within a vehicle position plotter unit which actually is located in the same casing as the heading and position indicator, the composite unit being identified as 16 in FIGS. 1 and 2.

The limit switch 62 supplies an output to set switches 68 whilst the limit switches 63 supply an output to set switches 69 and as will be seen position set push buttons identified east-west-north-south are provided for the set switches 68 and 69.

Outputs from the set switches 68 and 69 are supplied respectively to motors 70 and 71 having mechanical connections 72 and 73 to control the operation of a position and heading indicator 74. The indicator 74 also has a mechanical connection 75 to receive an output from synchro control transformer 76 and servo motor 77 which are interconnected by an amplifier 78, the mechanical and electrical connections being as shown in FIG. 2.

Electrical signals are supplied from the computer unit 14 along electrical connections 80 and 81 to the synchro control transformer 76 and the servo motor 77 as well as to a synchro receiver 82 located in the heading and position indicator unit 16.

Further details as to the construction and operation of the units of the navigation system associated with ball resolver 36 in computer 14, the units within the heading and position indicator 16 and the vehicle position plotter 16 will be found in the above-mentioned article by E. Wall in "Navigation." The present invention is concerned with an improvement or modification to that system and this improvement is concerned with the circuitry within the computer unit 14 and will now be described in greater detail.

The novel part of the navigation system includes the compass transmitter 10 in combination with the other units within the computer 14 as shown in FIG. 2. The output from the compass transmitter 10 is supplied along an electrical connection 32 to a control transformer 90 having a manual heading adjust control 91 via an electrical connection 92. The output from the control transformer 90 is supplied to the input of an amplifier unit 93 whose output is connected via a connection 94 to a servo motor unit 95 controlling a synchro transmitter 96 in a well known manner to provide an electrical signal along connection 81. Via mechanical output 97, the servo motor 95 controls the control transformer 90 and also provides a mechanical output via mechanical connections 98 and 99 to a sin $2\phi$ resolver unit 100 and a sin $(\phi-\theta)$ resolver unit 101 whose operation will be explained presently. The sin $(\phi-\theta)$ resolver unit 101 is provided with a mechanical adjustment control 102 and the outputs of the resolvers 100 and 101 are respectively fed through phase corrector units 107 and 103 having "B" and "A" adjustment controls 104 and 105. The outputs from the phase corrector units 107 and 103 are supplied in parallel along a common electrical connection 106 to the input of the amplifier 93 so as to provide a type of feedback to the amplifier 93.

Figure 3:
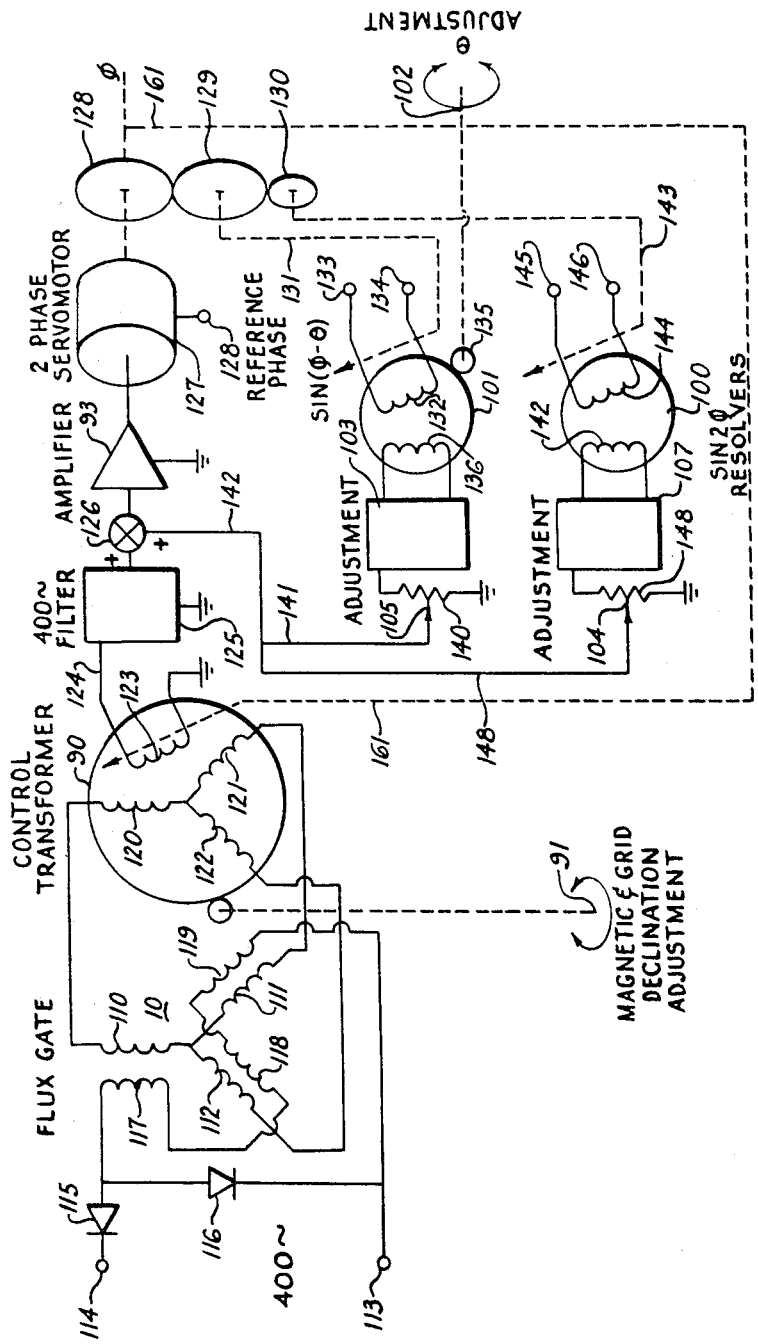
FIG. 3 is a diagrammatic representation of the compensating system which is utilized to compensate for magnetic disturbance effects which would otherwise result in a heading error.

Reference will now be made to FIG. 3 where the novel features of the navigation system according to the present invention are illustrated in greater detail.

It will be seen that the compass transmitter 10 includes three windings 110, 111 and 112 which are adapted to have voltages induced in them by the earth's magnetic field whereby the earth's magnetic field is defined in a known manner. Also in a known manner, a voltage at 400 cycles per second is applied by way of terminals 113 and 114 through diodes 115 and 116 to a further three windings 117, 118 and 119. The outputs from windings 110, 111 and 112 are supplied to the three windings 120, 121 and 122 of control transformer 90. As shown in FIG. 3, the manual adjustment 91 is operable on control transformer 90 as a magnetic and grid declination adjustment.

An output from control transformer 90 is obtained from winding 123 and is supplied along the connection 124 to a 400-cycle filter 125 and thence to the input of amplifier 93 via a junction connection 126. The output of amplifier 93 controls a 2-phase servo motor unit 127 having a 400 cycle per second reference phase applied to its terminal 128.

Operation of the 2-phase servo motor 127 causes rotation of a gear wheel 128 forming part of a gear train including a gear wheel 129 of the same diameter as gear wheel 128 and a further gear wheel 130 of half the diameter of gear wheels 128 and 129. A mechanical connection is also provided from the mechanical output of 2-phase servo motor 127 via mechanical connection 161 to the control transformer 90 as shown in FIG. 3.

A mechanical connection 131 is provided from gear wheel 129 to resolver unit 101 which includes a winding 132 supplied with a 400 cycle per second voltage via terminals 133 and 134. The mechanical adjustment 107 operates a wheel 135 whereby the setting of the resolver 101 can be adjusted in accordance with the angle $\phi$. Since the resolver also receives a mechanical input from gear wheel 129 in accordance with the angle $\phi$, the resolver 101 thus operates as a sin $(\phi-\theta)$ resolver. An electrical output from this resolver is provided by winding 136 and is fed to the phase corrector unit 103. The output of the phase corrector unit 103 is supplied across a potentiometer 140 and it will be seen that the "A" adjustment 105 is, in fact, the variable "tap-off" adjustment of the variable resistor 140. Thus, the output from the resolver 101 is supplied along a connection 141 to a common connection 142 which also receives a voltage output from the sin $2\phi$ resolver 100.

The sin $2\phi$ resolver 100 receives a mechanical input along mechanical connection 143 from the gear wheel 130. Resolver 100 includes a winding 144 which is supplied with a voltage at 400 cycles per second via terminals 145 and 146. An output from the sin $2\phi$ resolver 100 is obtained from winding 142 and is fed to the phase corrector unit 102 whose output is connected across a variable resistor 148, whose variable tap constitutes the manual "B" adjustment 104. Thus, an output from the sin $2\phi$ resolver is supplied an electrical connection 148 to the common connection 142 which is, as shown in FIG. 3, connected to the input of amplifier 93 via junction terminal 126. In this way, a feedback path is provided from the 2-phase servo motor 127 and the gear train 128, 129 and 130 through the sin $(\phi-\theta)$ and sin $2\phi$ resolvers to the input of amplifier 93.

The manual adjustments 102, 104, and 105 are made for the type of vehicle in which the navigation system is installed and in order to compensate for the permanent and induced magnetic disturbance effect due to the vehicle's magnetic mass. It will be seen that there is thus provided in FIG. 3 first compensating means for supplying a signal to compensate for the permanent magnetic disturbance effect due to the vehicle's magnetic mass and a further compensating means for supplying a signal to compensate for the induced magnetic effect of the earth's magnetic field concentrated in the vehicle. In this way, an accurate indication of the direction in which the vehicle is headed may be obtained substantially free from said disturbance effects as will be clear from a consideration of the theoretical aspects of this invention which will be described with reference to FIGS. 4 to 7.

CANCELLATION OF HEADING ERRORS RESULTING FROM VEHICLE MAGNETISM

(1) Introduction

A prime source of navigation error in a system employing a magnetic heading reference arises from the magnetic field due to the vehicle. The strength and direction of this disturbing field varies according to vehicle heading and latitude. Analysis and measurement have shown that the field has two components—a non-variable component introduced during construction of the vehicle, and a variable component of induced magnetism resulting from the earth's magnetic field. The described embodiment is a relatively inexpensive system of compensating for these disturbing factors which may produce an average navigation accuracy of better than 1% of distance travelled.

(2) Vehicle magnetic signature

Measurements of magnetic field at points close to the metallic structure of a vehicle show very little correlation in magnitude or direction due to the irregular orientation of the vehicle structural components. However, at a short distance (about 100 cm.) from the vehicle, the field is more uniform and closely resembles the field which would be produced by two dipoles (of correct intensity and angular alignment) situated within the vehicle envelope. One dipole would generate the permanent component of the vehicle's magnetic field and would be fixed in magnitude and position, while the other would vary in intensity and orientation depending on the strength and direction of the earth's magnetic field.

Figure 4:
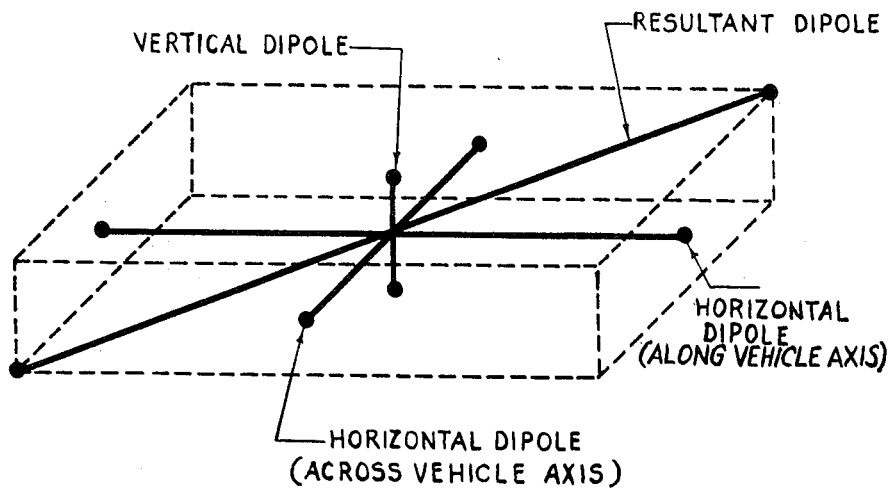
FIGS. 4, 5 and 6 are magnetic vector-type diagrams which will be used to explain part of the theory behind the present invention.

To facilitate mathematical analysis, each of the dipoles (permanent and induced) may be represented by three dipoles arranged mutually at right angles as shown in FIG. 4 with their mid-points intersecting at a common point, the magnetic centroid of the vehicle. Two of the dipoles are situated in the horizontal plane (at aproximately chasis level) while the third is arranged vertically. Correlation between actual field measurements on a typical vehicle and calculations based on the six-dipole model have confirmed the validity of this representation. In actual practice, the axes of the two vertical dipoles (permanent and induced) are found to closely coincide. Hence, if the compass transmitter is positioned on the axis of these dipoles, their fields have no effect on the instrument and heading errors due to the horizontal dipoles need only be considered.

(3) Heading error due to permanent field

Figure 5:
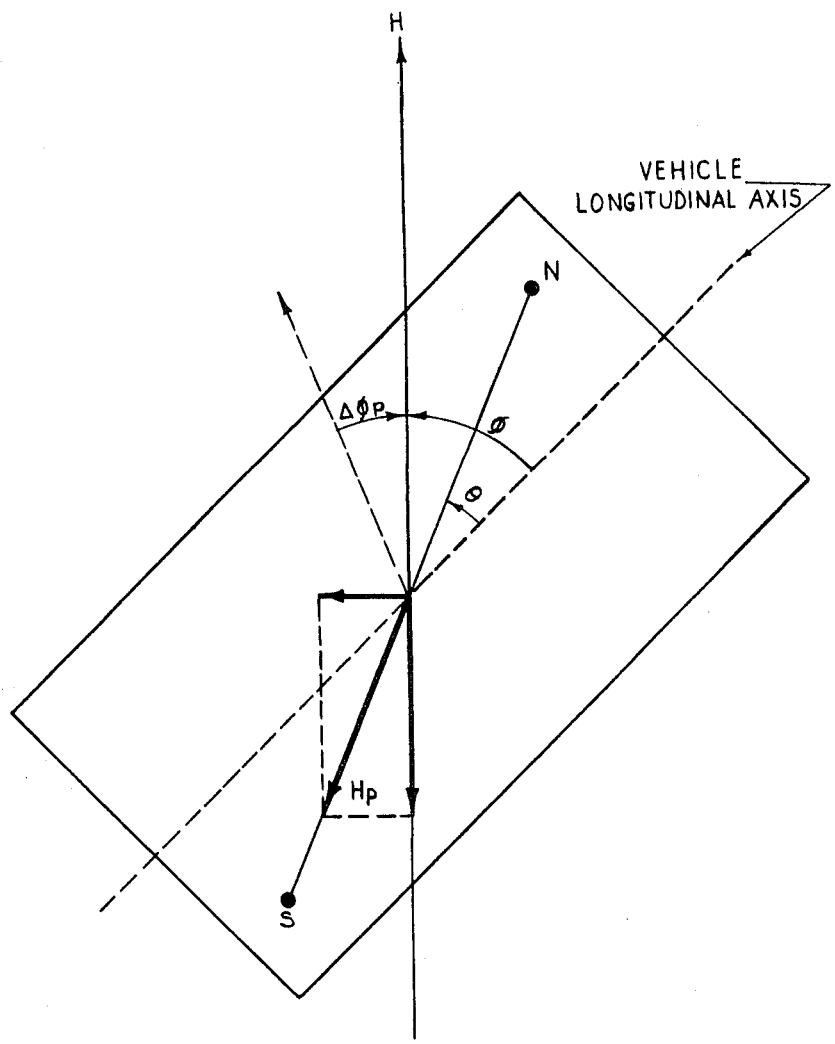

The heading error produced by the vehicle permanent field when the compass transmitter is positioned on the vertical dipole axis (as discussed in the previous paragraph) may be derived as follows:

Referring to FIG. 5, let vector H represent the horizontal component of the earth's field, and $H_P$ the horizontal component of the vehicle permanent field at the compass transmitter.

Then, the resultant vector in direction H is—

$$H - H_P \cos(\phi - \theta)$$

where $\phi$ and $\theta$ are the angles between the vehicle heading axis and H and $H_P$ respectively, and the field component at right angles to H is $$H_P \sin(\phi - \theta)$$

Hence, the error angle, $\Delta\phi_P$, is given by $$\Delta\phi_P = \tan^{-1}\left[\frac{H_P \sin(\phi - \theta)}{H - H_P \cos(\phi - \theta)}\right]$$

$$\Delta\phi_P = \tan^{-1}\left[\frac{(A \sin(\phi - \theta))}{(1 - A \cos(\phi - \theta))}\right]$$

where $$A = \frac{H_P}{H}$$

$$\Delta\phi_P \simeq \tan^{-1}[A \sin(\phi - \theta)]$$

where $A \ll 1$.

$$\Delta\phi_P \simeq A \sin(\phi - \theta) \text{ radians } (\Delta\phi_P \text{ small})$$

(4) Heading error due to induced field

The heading error produced by the vehicle induced field when the compass transmitter is positioned on the verticle dipole axis will now be derived.

Figure 6:
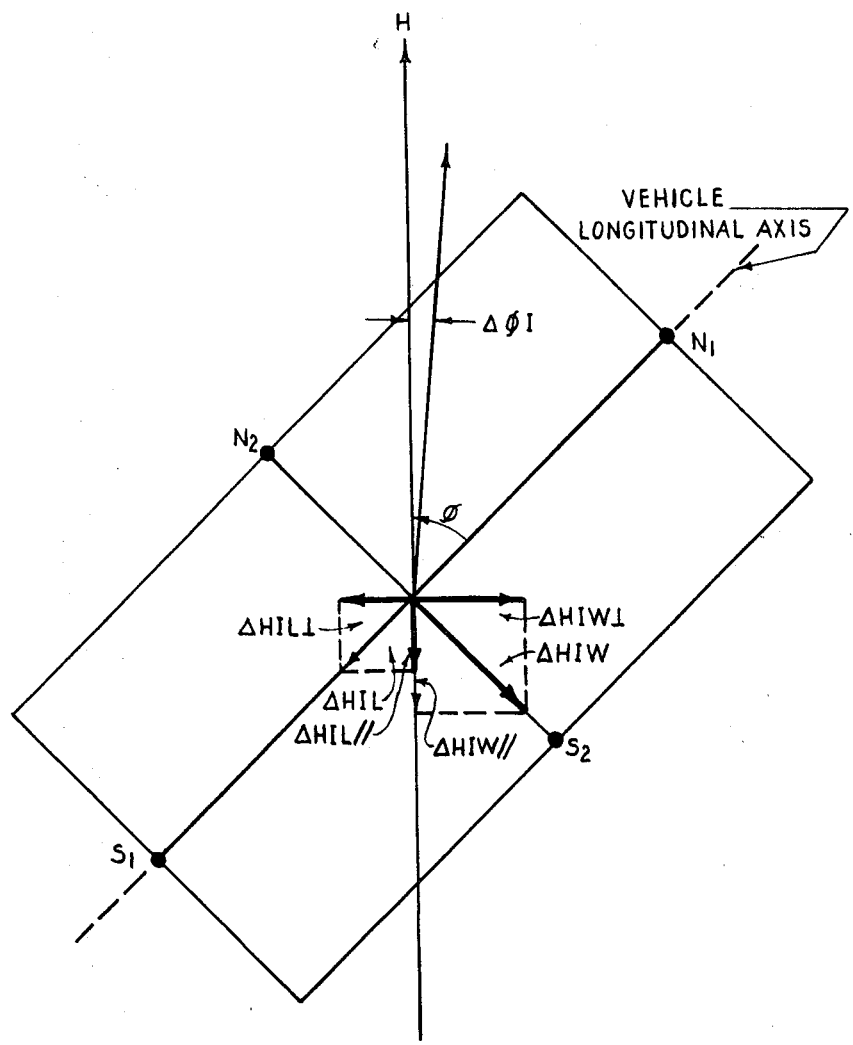
Figure 7:
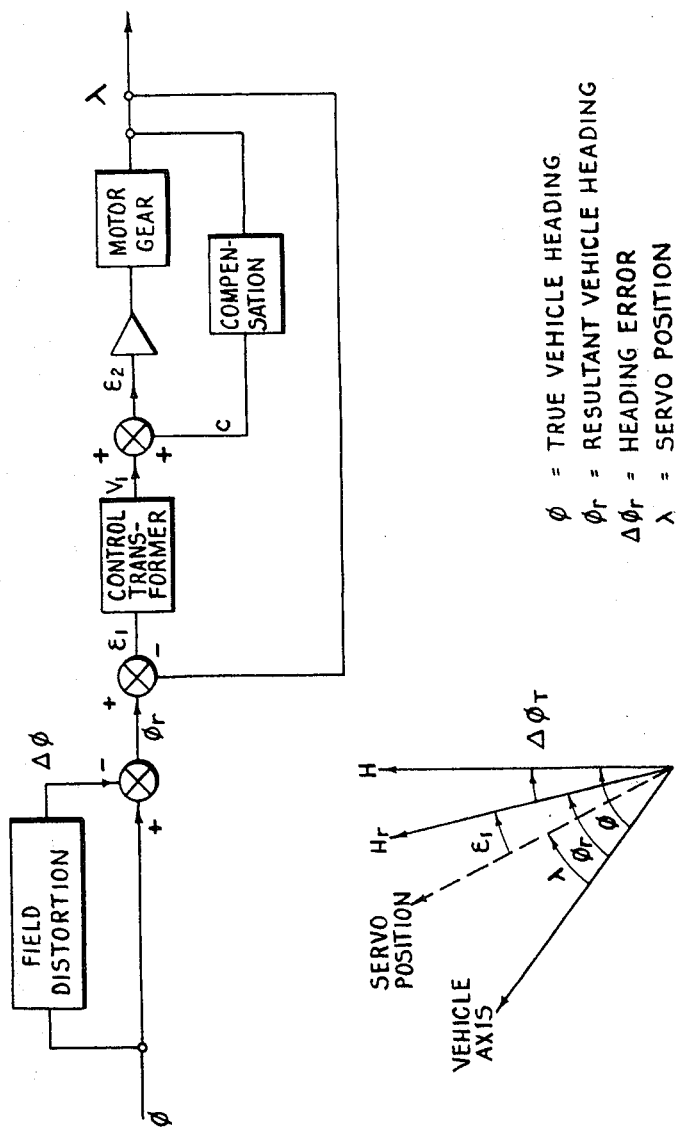
FIG. 7 is a diagrammatic representation of the compensating control loop system and will be used to explain part of the theory behind the present invention.

Referring to FIG. 6, the earth's horizontal component along the vehicle longitudinal axis and its corresponding transverse component induce two dipoles, $S_1N_1$ and $S_2N_2$, of magnitude $M_L$ and $M_W$ respectively. Since for low field intensities, the induced magnetism is proportional to field strength:

$$M_L = k_1 H \cos \phi$$
$$M_W = k_2 H \sin \phi$$

where $k_1$ and $k_2$ are constants depending on the permeability and cross-sectional areas of the vehicle metal part in the two directions.

The intensities of the horizontal field components (longitudinal and transverse) produced by these dipoles at a point on the axis of the vertical induced dipole are respectively given by—

$$\Delta H_{IL} = k_1 k_3 . H \cos \phi$$
$$\Delta H_{IW} = k_2 k_4 . H \sin \phi$$

where $k_3$ and $k_4$ are constants determined by the distances of the point to dipole extremities, or $$\Delta H_{IL} = K_1 H \cos \phi$$
$$\Delta H_{IW} = K_2 H \sin \phi$$

The resultant field component in a direction normal to H due to $\Delta H_{IL}$ and $\Delta H_{IW}$ is $$\Delta H_{I\perp} = H.(K_1 - K_2) \sin \phi \cos \phi$$
$$= H.B. \sin 2\phi, \text{ where } B = \tfrac{1}{2}(K_1 - K_2)$$
$$= \tfrac{1}{2}(k_1 k_3 - k_2 k_4)$$

The resultant field component in the direction of H due to $\Delta H_{IL}$ and $\Delta H_{IW}$ is $$H_{I//} = H.(K_1 \cos^2 \phi + K_2 \sin^2 \phi)$$

Hence, the heading error angle $$\Delta\phi_I = \tan^{-1}\left[\frac{(\Delta H_{I\perp})}{H - \Delta H_{I//}}\right]$$

In practice, $H \gg H_{I//}$
and $$\Delta\phi_I \simeq \tan^{-1}(B \sin 2\phi)$$
$$\Delta\phi_I \simeq B \sin 2\phi \text{ radians } (\Delta\phi_I \text{ small})$$

Hence, the heading error due to the induced field is independent of H, and depends on the vehicle permeability and dimensions, the point of measurement and vehicle heading.

(5) Heading error compensation system

The previous analysis (which has been confirmed by experiment) shows that if the compass transmitter is mounted on or near the axis of the equivalent vertical dipole of vehicle magnetism, the total heading deviation angle ($\Delta\phi_T$) due to the vehicle's field is closely represented by $$\Delta\phi_T = A \sin(\phi-\theta) + B \sin 2\phi$$

where $\phi$ is the heading angle, and A, B and $\theta$ are constants.

The method of compensating for compass deviation according to the present invention consists of generating voltages proportional to $\sin(\phi-\theta)$ and $\sin 2\phi$, and adding them to the compass transmitter signal (proportional to $\phi+\Delta\phi_T$) in a position-servo loop as shown in the system block diagram of FIG. 3.

The compass transmitter is mounted about 100 cm. above the magnetic centroid of the vehicle and is energized from the 400 c.p.s. supply. Voltages are induced in each arm of the compass transmitter proportional to the component of earth's magnetic field (deviated by the vehicle's own field) intersecting the arm. These voltages are fed to a control transformer which generate an internal field whose direction is identical to the field at the compass transmitter.

The rotor on the control transformer detects an error voltage representing the difference between the field direction and the angular position of the servo output shaft ($\lambda$). This is summed with two voltages from the error compensating resolvers (which are also positioned by the servo) and applied to the control amplifier. Provided that the compensating loop is properly aligned, i.e. constants $\theta$, A and B are correctly set, the servo will null to the true direction of the horizontal component of the earth's field.

When the servo is nulled (FIG. 7), $$\epsilon_2 = V_1 + c = 0$$

But $$V_1 = k_5\epsilon_1 = k_5(\phi_r - \lambda)$$

where $k_5$ is the transfer function (volts/radian) of the control transformer (assumed constant in the null region), $\lambda$ is the servo angular position, and $\phi_r$ is the direction of the disturbed earth's magnetic field relative to the vehicle axis.

Also $$\phi_r = \phi - \Delta\phi_T$$
$$= \phi - (A \sin(\phi-\theta) + B \sin 2\phi)$$

where A, B and $\theta$ are constants previously defined.
Let $$c = D \sin(\lambda-\alpha) + E \sin 2\lambda$$

where D and E are the amplitudes of the two compensating components and $\alpha$ is a phase angle setting in balance, then $$k_5\phi - [(A \sin(\phi-\theta) + B \sin 2\phi) - \lambda]$$
$$= -D \sin(\lambda-\alpha) - E \sin 2\lambda$$

From the equation symmetry, it may be seen that the servo will position to the true heading angle ($\lambda=\phi$) when $D = k_5A$
$E = k_5B$, and
$\alpha = \theta$ Dynamic analysis of the system has shown that if D, E and $\alpha$ are adjusted to these values, the heading indicator aligns with the horizontal component of the earth's field, H. In practice, the servo loop setting controls are calibrated so that quantities A and B are set into the system rather than D and E.

(6) Alignment of compensation system

The following simple alignment procedure is employed for setting the compensation constants A, B and $\theta$:

(a) Align the vehicle to face magnetic north with its axis parallel to the earth's true undeviated magnetic field. Set controls A and B to zero for no compensation.
(b) Measure the heading error $\Delta\phi_N$.
(c) Rotate the vehicle exactly 90° to face east.
(d) Measure the heading error $\Delta\phi_E$.
(e) Compute $$\theta = \tan^{-1} \frac{\Delta\phi_N}{\Delta\phi_E}$$

(f) Compute $$A\sqrt{\Delta\phi^2_N} = \Delta\phi^2_E$$

(g) Adjust $\theta$ and A controls to appropriate settings.
(h) Rotate the vehicle exactly 45° to face north-east.
(j) Adjust amplitude of B control ($\sin 2\phi$ correction) for zero error.
(k) Finally, correct the heading indicator for magnetic declination and grid declination errors using map information.

The invention has been described above as applicable to a land vehicle such as a jeep or a truck. However, it will be appreciated that it is applicable to several types of vehicle once the necessary calculations of the magnetic mass of the vehicle have been made to enable the necessary compensation adjustments to be made.

In exceptional circumstances, if an excessive amount of ferrous metal is in the vicinity of the navigation system within a vehicle, then tests should, of course, be made to ensure that the navigation accuracy of the system is not affected. In practice, it has been found that the accuracy is not affected when a vehicle is loaded with a reasonable quantity of equipment.

A further embodiment of the present invention is illustrated diagrammatically in FIG. 9.

The further embodiment is similar to the first embodiment as shown in FIGS. 1, 2 and 3 except that the compass transmitter is replaced by two coils 150 and 151 positioned at 90° with respect to each other having a common axis and mounted on a mast 152 which is capable of rotation by a servo motor unit 153. The output of the magnetic sensor coils 150 and 151 is fed directly to the amplifier 93 without the use of the control transformer 90 (FIG. 1). A mechanical connection 154 is provided from the output of servo motor 127 to a gear wheel 155 forming part of the servo motor arrangement 153.

The operation of this rotating mast embodiment is as follows:

If the sum of the signals from the two coils 150 and 151 and the signals from the two corresponding resolvers 100 and 101 is zero, then the servo motor 127 does not turn. However, if the sum of said signals is not zero, then the resultant voltage is amplified by the servo amplifier 93 and the servo motor 127 is made to turn thus driving the two resolver units 100 and 101 and consequently, the mast 152 by way of mechanical connection 154 and servo motor 153. The mast continues to turn until said sum of said signals becomes zero. When this occurs, the output shaft gives an indication of magnetic North.

We claim:
1. A heading reference system for a movable vehicle including:
(a) a magnetic sensing means mounted substantially vertically above the vehicle's magnetic controid to sense the horizontal component of the earth's local magnetic field and define the direction of the horizontal component of the earth's local magnetic field by means of an electrical output,
(b) supply means for supplying the electrical output from said magnetic sensing means to the input of amplifier means adapted to control the operation of a servo motor unit,
(c) a gear wheel forming part of a gear train adapted to be driven by said servo motor unit to provide a mechanical output to control a compensator resolver unit,
(d) said compensator resolver unit supplying a signal to compensate for the horizontal component of a magnetic disturbance effect whereby heading refer- ence information is obtained substantially free from said disturbance effects to provide a corrected indication as to the vehicle's heading.

2. A system according to claim 1 wherein said magnetic sensing means is a magnetic compass unit mounted on a mast extending above the vehicle.

3. A heading reference system according to claim 2 wherein said magnetic sensing means comprises a pair of coils arranged to intersect the earth's local magnetic field and mounted with their axes at substantially 90° to each other and mounted on said mast above the vehicle.

4. A heading reference system according to claim 3 wherein said mast is a rotatable mast.

5. A heading reference system for a vehicle including:
   (a) a magnetic sensing means mounted substantially vertically above the vehicle's magnetic centroid to sense the earth's local horizontal magnetic field and define the direction of said horizontal magnetic field by means of an electrical output;
   (b) means for supplying the electrical output from said sensing means to the input of amplifier means adapted to control the operation of a servo motor unit;
   (c) a gear wheel forming part of a gear train adapted to be driven by said servo motor to provide a mechanical output to control a first resolver unit and a second resolver unit;
   (d) said first resolver unit providing an output proportional to sin $(\phi-\theta)$ and said second resolver unit providing an output proportional to sin $2\phi$ where $\phi$ is the heading angle of the vehicle with reference to magnetic North and $\theta$ is the phase of the compensation for the permanent magnetic disturbance effect due to the vehicle's magnetic mass; and
   (e) means for supplying the outputs of said first and second resolver units to the input of said amplifier as a feedback voltage to compensate for the permanent magnetic disturbance effect due to the vehicle's magnetic mass and for the induced magnetic effect of the earth's magnetic field concentrated in the vehicle whereby heading reference information can be obtained substantially free from said disturbance effects to provide a corrected indication as to the vehicle's heading.

6. A system according to claim 5 wherein said magnetic sensing means is a magnetic compass unit mounted on a mast extending above the vehicle.

7. A heading reference system according to claim 6 wherein said magnetic sensing means comprises a pair of coils arranged to intersect the earth's local magnetic field and mounted with their axes at substantially 90° to each other and mounted on said mast above the vehicle.

8. A heading reference system according to claim 7 wherein said mast is a rotatable mast.

References Cited

UNITED STATES PATENTS 2,959,866  11/1960  Seaman _____ 33—224

OTHER REFERENCES

E. Wall: A Dead-Reckoning Land Vehicle Navigation System, Journal of the Institute of Navigation, vol. 12, No. 1, Spring 1965, pp. 77–89.

S. G. Starling: Electricity and Magnetism, Longmans, Green & Co., Ltd., 1929, pp. 46–50.

LEONARD FORMAN, Primary Examiner

S. L. STEPHAN, Assistant Examiner

U.S. Cl. X.R.

33—141.5, 222